Nov. 28, 1939.   C. E. JOHNSON ET AL   2,181,567
VARIABLE SPEED UNIT
Original Filed June 27, 1933   2 Sheets-Sheet 1
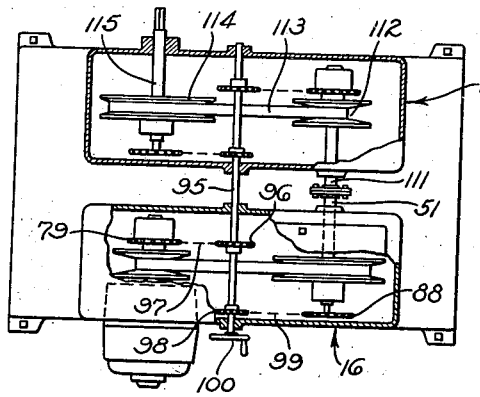
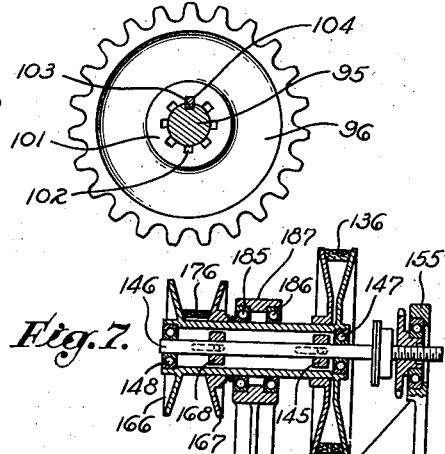
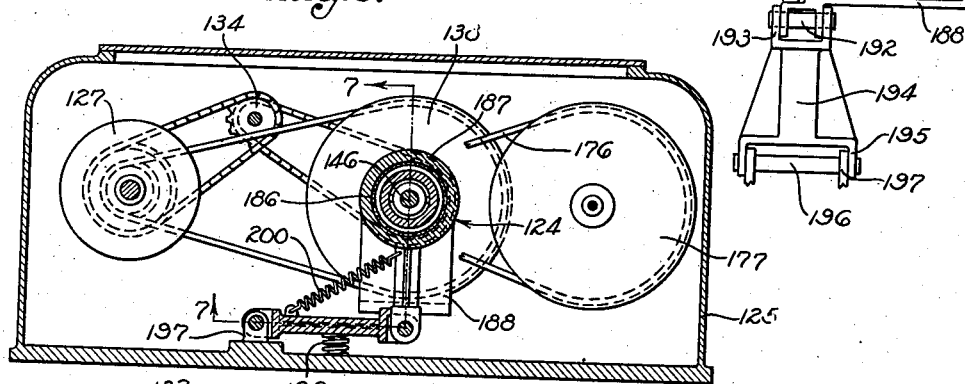
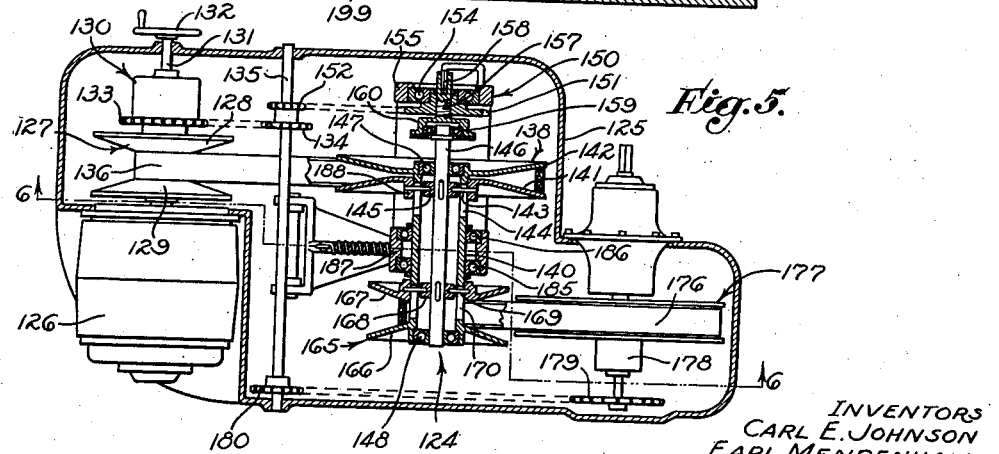
INVENTORS
CARL E. JOHNSON
EARL MENDENHALL
BY
HARRIS, KYECH, FOSTER & HARRIS
ATTORNEYS.

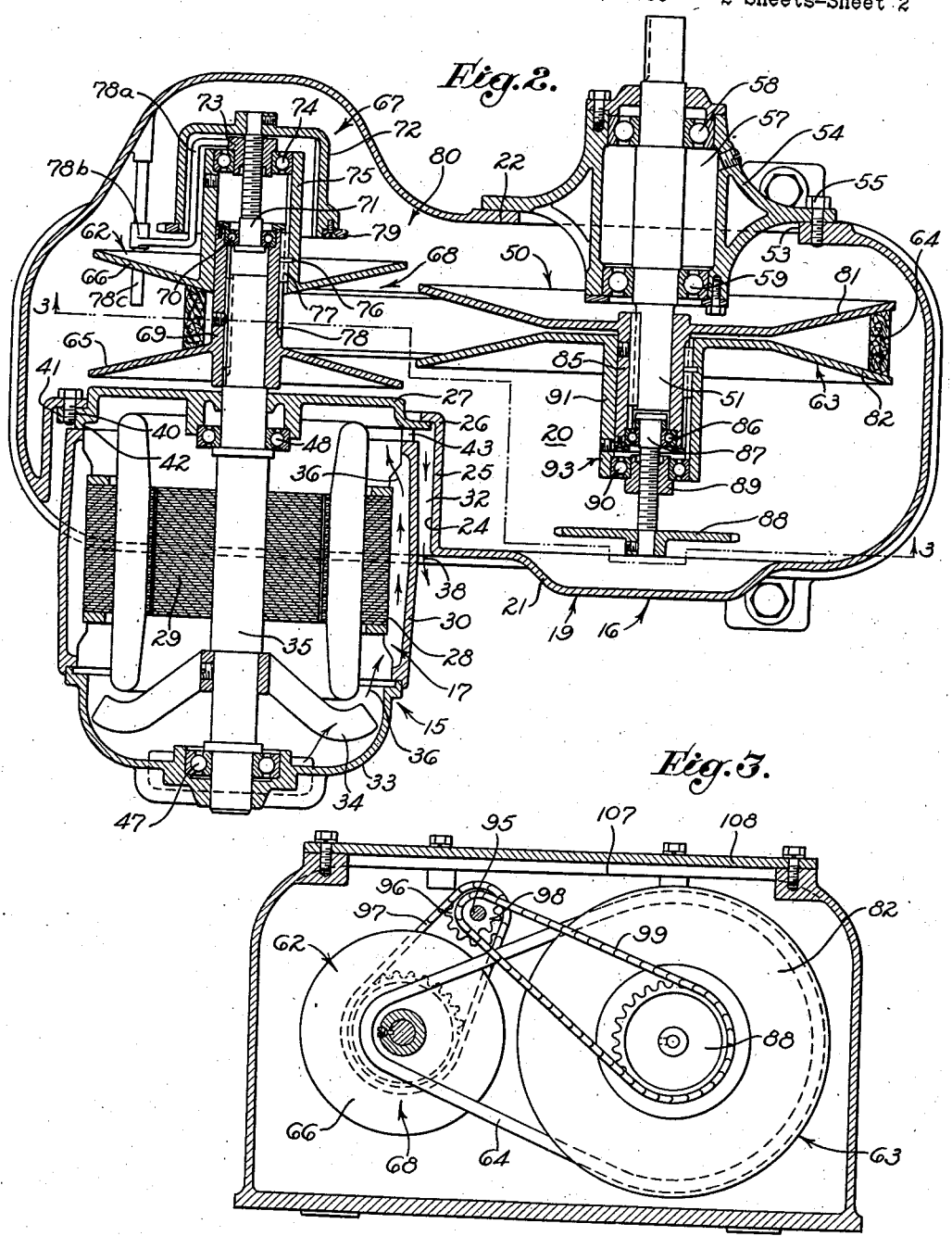

Patented Nov. 28, 1939

2,181,567

UNITED STATES PATENT OFFICE 2,181,567

VARIABLE SPEED UNIT

Carl E. Johnson, Pasadena, and Earl Mendenhall, Los Angeles, Calif.

Continuation of application Serial No. 677,863, June 27, 1933. This application February 19, 1938, Serial No. 191,442

15 Claims. (Cl. 74—230.17)

This application is a continuation of our copending application, Serial No. 677,863, filed June 27, 1933, entitled "Variable speed unit".

Our invention relates to a novel variable speed system particularly applicable in conjunction with an electric motor whereby a new combination of elements is utilized in changing the speed ratios between a drive shaft and a driven shaft.

The change in speeds possible with existing variable speed structure is relatively limited, seldom being more than 8 to 1. A larger speed ratio is desirable in many installations, and the present invention has for one of its objects the provision of a novel system utilizing two variable speed units operatively connected together in a novel manner so that speed ratios as high as 100 to 1 may be secured.

The invention is applicable to various types of variable speed systems, but in the preferred embodiment we prefer to utilize the type of variable speed unit including a V-belt or its equivalent in conjunction with one or more variable diameter pulley means, preferably of the type including a pair of flange members which can be moved toward and away from each other. In existing structures these flanges are moved toward and away from each other by a spring, this spring being compressed as the belt is drawn inward toward the axis of rotation, thus permitting the flanges to be resiliently moved away from each other. This system is open to serious limitations, especially in high-torque equipment. One fundamental defect thereof is that the belt tends to creep toward the axis of rotation of the shaft when the torque is suddenly increased, thus resulting in unequal speeds, a loosening of the belt, and unstable operation.

It is an object of the present invention to mechanically interconnect the flange members of such a pulley by an adjustment means, utilizing other means for compensating for the change in position of the belt as it moves inward and outward between these flange members as the speed is being changed.

Another object of the present invention is to provide two sets of such mechanically interconnected flange members, one set being on the drive shaft and the other being on the driven shaft, together with a control means which simultaneously adjusts both sets. With such a system the axes of the shafts can be fixed in position, thus eliminating any resilient means heretofore necessary in moving one shaft relative to the other to compensate for change in conditions as the belt moves toward and away from the axis of rotation. Other features of the invention lie in the details of this system, illustrated in the accompanying drawings.

It is often desirable to utilize one pulley means of larger diameter than the other. With such a system it has been found desirable to move the adjustment means of each pulley simultaneously, but at different rates, and this feature constitutes an important detail of the present invention.

It is also desirable to provide a system wherein the belt can be tightened, and a feature of the present invention lies in the structure for accomplishing this end by changing the relationship between the control means and the adjustment means.

Still other features of the invention lie in the novel relationship between the motor and the novel placement speed-control unit involving a novel circulation of cooling of the motor and a novel structure which is readily adapted to standardization of parts.

Another object of the invention is to provide such a variable speed system in which the belt can be replaced without dismantling the structure.

Another object of the invention is to provide a novel variable speed system which is capable of operating high torque loads, this being accomplished by dividing the speed-control means into two units, one unit being capable of transmitting a higher torque than the other.

An addditional feature is to provide a movable countershaft capable of controlling the tension in the belts of such a two-unit system.

Other objects and advantages of the invention lie in the particular structures disclosed, as well as in the more general combinations to be hereinafter described.

Referring particularly to the drawings:

Fig. 1 is a top view showing in general the relationship between the parts of my system which permits the obtaining of relatively high speed ratios.

Fig. 2 is a horizontal view partially in section, illustrating in detail one of the units disclosed in Fig. 1, and more particularly the unit to which the motor is directly connected.

Fig. 3 is a vertical sectional view taken along the line 3—3 of Fig. 2.

Fig. 4 is a sectional view illustrating the tension adjusting means.

Figs. 5, 6, and 7 are sectional views of an alternative form of the invention, Fig. 6 being taken along the line 6—6 of Fig. 5, and Fig. 7 being taken along the line 7—7 of Fig. 6.

Referring particularly to Fig. 2, we have shown a novel sub-combination of the invention comprising a motor unit, indicated in general by the numeral 15, including a transmission unit, indicated by the numeral 16, and an electric motor, indicated by the numeral 17.

This transmission unit 16 is shown as including an enclosing shell 19 defining a transmission chamber 20. This shell is of novel construction, including side walls 21 and 22, there being a recess 24 formed in the side 21 by an annular wall 25 extending into the transmission chamber 20 and terminating in a flange 26. Extending across this flange is a plate 27 which forms an end bell of the motor 17. This motor may be of conventional construction including a stator 28 and a rotor 29 enclosed in a motor casing 30. The external diameter of the motor casing is smaller than the internal diameter of the wall 25 to define an annular space 32 therebetween which communicates with the atmosphere. The outer end of this motor shell may be closed by an end bell 33 providing a suitable opening through which air may be drawn by a means such as a fan 34 secured to a shaft 35 on which the rotor is mounted and hereinafter termed a drive shaft. This fan circulates the air or other cooling medium through the motor in cooling relationship with its parts. In the form of motor shown this circulation is indicated by arrows 36 and takes place around the stator 28 in an annular space defined between this stator and the motor casing 30. This cooling medium then moves through the annular space 32 and is discharged therefrom as indicated by arrows 38.

It is desirable to detachably connect the motor in the recess 24 in the form of the invention shown. This is accomplished by the use of bolts 40 extending through the flange 26 and into a flange 41 formed on the plate 27. The plate 27 and its flange 41 are suitably secured to the motor casing 30 by means of an annular shoulder 42. Openings 43 are formed at intervals around this annular shoulder to permit circulation of the cooling medium, as indicated by the arrows 36 and 38.

This structure is particularly valuable in that it prevents the medium circulating through the motor from entering the transmission chamber 20. If the circulation were permitted to take place through this chamber, the belt means would be detrimentally affected by the heat conditions in the motor. In addition, the cooling medium often carries suspended dust or other foreign matter which would be deposited on the working parts in the transmission chamber if the circulation took place therethrough.

The drive shaft 35 is supported by bearings 47 and 48 forming a part of the motor 17, so that it is unnecessary to journal this drive shaft 35 at any position inside the transmission chamber 20. Furthermore, this structure is particularly valuable in that the motor, and all of the members attached to the drive shaft, can be removed from the enclosing shell 16 as a unit, thus permitting easy adjustment, repair, or replacement. Furthermore, the structure wherein the motor is partially positioned in the recess 24 is particularly valuable in that the motor unit 15 can be made much smaller than would otherwise be the case, and the drive shaft 35 can be made relatively short, thus not only effecting a saving in material but preventing the necessity of auxiliary bearings for this shaft in the transmission chamber 20.

Positioned in the chamber 20 is a transmission means, indicated in general by the numeral 50, adapted to operatively connect the drive shaft 35 and a driven shaft 51 in such a manner that the speed ratios therebetween can be readily changed. In Fig. 2 we have shown one embodiment of such a transmission means which finds particular applicability in the motor unit 15. Certain types of variable speed transmission means of the V-belt type require the use of spring means for compensating for conditions resulting when the speed ratio is changed. Such a resilient means is entirely dispensed with in the form of the invention shown in Fig. 2.

We have shown the side wall 22 as including an opening 53 closed by a bearing member 54 suitably secured thereto as by cap screws 55. This bearing member includes a lubricant-containing chamber 57 through which the driven shaft 51 extends. Bearings 58 and 59 are placed at opposite ends of this chamber 57 and journal the driven shaft 51 which extends from a point exterior of the enclosing shell 16 to a point inside the transmission chamber 20, but not completely thereacross so that the inner end of this shaft is separated from the side wall 21.

The transmission means 50 disclosed includes a variable-diameter pulley means of the adjustable V-type attached to the drive shaft 35 and indicated in general by the numeral 62, hereinafter termed a primary pulley means, and a secondary variable-diameter pulley means of the adjustable V-type, indicated in general by the numeral 63 and attached to the driven shaft 51, these pulley means being operatively connected by a belt means 64 which is preferably of the V-type.

Referring particularly to the primary pulley means 62, the preferred construction includes flange members 65 and 66 rotating with the shaft and movable toward and away from each other through the medium of an adjustment means, indicated in general by the numeral 67. The flange members 65 and 66 are frusto-conical in shape to provide a V-shaped channel 68 in which the belt means 64 extends. By moving the flange members toward each other the belt means 64 moves outward, thereby changing the effective diameter of the pulley means 62.

The flange member 65 carries a sleeve 69 suitably keyed to the drive shaft 35 and extending to a position beyond the end thereof. The end of the sleeve 69 is counterbored to receive the outer race of a ball bearing 70 of the adjustment means 67, the inner race of this bearing carrying an adjustment shaft 71 axially aligned with the drive shaft 35. A press fit may be formed between this inner race and the shaft 71, thus permitting the shaft 71 to move independently of the drive shaft 35. The outer end of this adjustment shaft 71 is threaded and carries an adjustment member 72 forming a part of the adjustment means 67. This adjustment means also includes a nut 73 threaded to the adjustment shaft 71 and carrying the inner race of a bearing 74 of the ball type. The outer race of this bearing fits into the end of a sleeve 75 which is slidable relative to the sleeve 69. These sleeves may be suitably keyed together by any means preventing relative rotation therebetween. In the form shown a pin 76 carried by the sleeve 75 extends into a key 77 which in turn is slidable in a keyway 78 of the sleeve 69 to permit longitudinal movement of these sleeves. The flange member 66 is suitably secured to or made integral with the sleeve 75.

The elements forming the adjustment means 67 cooperate in moving the flange members 65 and 66 toward and away from each other even while the motor is in operation. Thus, considering that the motor is rotating, the adjustment shaft 71 will normally be stationary. By turning this shaft through the medium of the adjustment member 72, the nut 73 is advanced along the threaded portion of the shaft 71, thereby moving the sleeve 75 relative to the sleeve 69 and thereby changing the distance between the flange members 65 and 66. To prevent rotation of the nut 73 with the adjustment member 72 it is usually desirable to provide some means for holding this nut stationary. In the form shown, this means includes a rod 78a secured to the nut 73 and bent to extend outward between the sleeve 75 and the adjustment member 72. The end of this rod carries an eye 78b which is slidable on a pin 78c extending inward from the side wall 22. The cup 72 is positioned entirely inside the transmission chamber 20 and may be moved through the medium of a sprocket 79 forming a part of a control means 80 to be hereinafter described.

The pulley means 63 secured to the driven shaft 51 is of somewhat similar construction and includes flange members 81 and 82 cooperating in forming a V-shaped groove receiving the belt means 64. A sleeve 85 is carried by the flange member 81 and is suitably keyed to the driven shaft 51, extending a distance therebeyond. The free end of this sleeve is counterbored to receive the outer race of a bearing 86, this outer race being suitably secured in the counterbore of the sleeve. The inner race of this bearing is pressed onto an adjustment shaft 87, the outer end of which is threaded and carries a sprocket 88 forming a part of the control means 80. A nut 89 is threaded to the adjustment shaft 87 and is carried by the inner race of a ball bearing 90, the outer race of this ball bearing being carried by a sleeve 91 telescoping with the sleeve 85 and carrying a flange member 82. Key means similar to that previously described may be utilized for preventing relative rotation between the sleeves 85 and 91. Means may also be provided for preventing rotation of the nut 89 with the adjustment shaft 87, this means including a rod sliding on a pin similar to the construction previously described. Thus, when the sprocket 88 is turned, the adjustment shaft 87 journals in the bearing 86 and moves the nut 89 along this shaft. The nut 89 acts through the medium of the bearing 90 to move the sleeve 91 and thus the flange member 82. The structure interconnecting the adjustment shaft 87 and the flange members 81 and 82 thus comprises an adjustment means designated in general by the numeral 93.

It is an important feature of the present invention, when using a transmission means such as illustrated, to simultaneously adjust the pulley means 62 and 63, the effective diameter of one pulley means being increased while the effective diameter of the other pulley means is decreased. This is accomplished through the control means 80 which comprises any suitable means for simultaneously operating the adjusting means 67 and 93. In the embodiment of the invention illustrated, see particularly Fig. 3, this control means is shown as being in the form of a countershaft 95 which may be journalled in the side walls 21 and 22 to extend across the transmission chamber 20 at a position above the belt means, or at any other convenient position. This countershaft 95 carries a sprocket 96 which is connected to the sprocket 79 by a chain 97. So also, the countershaft carries a sprocket 98 which is operatively connected to the sprocket 88 through a chain 99. The outer end of the countershaft carries a hand wheel 100 or other suitable means for manually or automatically turning this countershaft so that the adjustment means 67 and 93 will be simultaneously moved. The system is so made that when the effective diameter of one pulley means is increased, the effective diameter of the other is decreased.

It has often been found desirable to make one of the pulley means of larger diameter than the other. Thus, the pulley means 63 has been illustrated as being of much larger diameter than the pulley means 62.

There is inevitably a slight stretch in the belt means 64 after the unit has been in operation for a long period of time. It is thus preferable to provide some adjustment means for adjusting the tension in this belt. Such an adjustment means is also very desirable in view of the fact that when replacing one belt with another, it is almost impossible to secure belts of exactly the same length. In view of the fact that in the preferred embodiment the axes of the drive and driven shafts are in fixed position, it is not usually desirable to change the tension of the belt by moving one or the other of these shafts, though this can be done by extending the cap screws 55 through openings in the bearing member 54 which are larger in diameter than the cap screws. So also, it is not desirable to utilize an idler for adjusting the tension of the belt. In the preferred embodiment this adjustment is effected by changing the relative positions of the adjustment means 67 or 93 with respect to the countershaft 95. This may be done by temporarily removing one of the chains and advancing or retracting the corresponding adjustment means until the desired tension is reached after which the chain is again interconnected with the countershaft 95. However, in the preferred embodiment one of the sprockets is adjustably mounted with respect to its shaft so that such movement of one adjusting means relative to the other can be easily effected. In the form shown (see Fig. 4), the sprocket 96 includes a hub 101 including a plurality of keyways 102 formed therein and opening on the central bore through which the shaft 95 extends. The shaft 95 carries a keyway 103. A key 104 is inserted in the keyway 103 and into any desired keyway 102 of the sprocket 96, thus adjusting the relative position of the sprocket and the countershaft and thus permitting moving the adjustment means 67 relative to the adjustment means 93. The net effect is to adjust the tension in the belt 64.

The construction shown in Fig. 2 is also particularly valuable in that it permits replacement of the belt means without dismantling the unit. Thus, the enclosing shell 19 of the transmission unit 16 provides an elongated opening 107 in the upper wall thereof and normally closed by a cover 108. When it is desired to replace the belt means this cover is removed, and the chains connected to the sprockets 79 and 88 are temporarily removed. The corresponding adjustment means 67 and 93 are then turned relative to each other so as to permit the belt means to slide inward in one pulley a sufficient distance so that it can be removed from the other pulley. Due to the fact that the drive shaft 35 and the driven shaft 75

51 do not extend completely across the transmission chamber 20, it is an easy matter to remove the belt, sliding this belt through the space beyond the ends of these respective shafts and removing it through the opening 107.

It is often desirable to be able to secure speed ratios substantially greater than that possible with a single transmission unit, such as shown in Fig. 2. Thus, we have found it desirable to combine two or more of these transmission units, and control all of the units by a single control means. Such a system may include several sets of variable-diameter pulleys in the same enclosing structure, but in the preferred embodiment we prefer to utilize separate enclosing structures for each set. Thus, in Fig. 1 we have illustrated a motor unit 15 such as previously described, and including the transmission unit 16, in conjunction with an auxiliary transmission unit indicated by the numeral 110. This auxiliary transmission unit may be of the form similar to that shown in detail in Fig. 2. With such a combination the driven shaft 51 of the transmission unit 16 is directly or indirectly connected to a shaft 111 of the transmission unit 110 so that the shafts 51 and 111 comprise a countershaft means.

The transmission unit 110 is shown as comprising a variable-diameter pulley means of the adjustable V-type 112 carried by the shaft 111 and connected by a belt 113 to a variable-diameter pulley means indicated by the numeral 114 and operatively connected to a driven shaft 115. Each of these pulley means includes an adjustment means such as previously described so that the entire combination includes four adjustment means. It is desirable to provide a unitary control for these adjustment means, and for this purpose we have shown the countershaft 95 as extending through both transmission units, and carrying sprockets which are respectively connected to all four of the adjustment means. Thus, by turning this countershaft 95 of the control means all four of the adjustment means are simultaneously changed, thus permitting speed variations as high as 100 to 1.

It should be understood that a separate control means may be used for the transmission unit 110 in which event the control means of the two transmission units will be either directly or indirectly connected together. Thus, it is possible to use two identical units such as shown in Fig. 2, the driven shaft of one being directly or indirectly connected to the drive shaft of the other, and the control means of each unit being operatively connected together by gears, sprockets, etc., so that both units are simultaneously adjusted.

So also, it should be understood that this general combination of two transmission units, each of the variable-speed type, and controlled by a single control means, is new regardless of the details of the particular transmission means utilized. Thus, assuming that each transmission unit has a separate regulating means for changing the speed relationships between its shafts, the invention includes the series connection of such transmission units with a control means for operatively connecting the regulating means of each transmission unit. Such transmission units, for instance, might be of the spring-actuated type well known in the art and wherein the flanges of one or more pulley means are moved toward and away from each other by resilient means or wherein the distance between the shafts is changed by resilient means.

In Figs. 5 to 7 we have illustrated an alternative form of the invention including a floating countershaft 124. Here both transmission units may be positioned in the same enclosing structure 125.

A motor 126 is utilized, the shaft of this motor carrying a pulley means 127 of the adjustable V-type similar to that disclosed in Fig. 2 and including flange members 128 and 129. The flange member 128 is moved by an adjustment means 130 similar to the adjustment means 67 previously described, the adjustment shaft being indicated by the numeral 131 extending through the casing to carry a hand wheel 132 through which control may be effected. A sprocket 133 on the adjustment shaft is connected by a suitable chain to a sprocket 134 mounted on a countershaft 135 suitably journalled in the shell.

A belt means 136 operatively connects the pulley means 127 to a pulley means 138 mounted on a floating countershaft 140, this shaft being hollow. This pulley means 138 comprises flange members 141 and 142, the former being connected by pins 143 extending through elongated slots 144 of the countershaft 140 to a ring 145 positioned therein. This ring is suitably fixed to a control shaft 146, there being bearings 147 and 148 between the control shaft and the countershaft 140. The flange member 142 is carried by the countershaft 140 so that if the control shaft 146 is moved axially the flange member 141 is carried therewith to adjust the pulley means 138. This axial movement takes place through an adjustment means 150 shown as including a sprocket 151 connected by a chain to a sprocket 152 carried by the shaft 135. This sprocket 151 is suitably journalled by a bearing 154 in a floating base 155. Further, this sprocket is threaded to receive an adjustment shaft 157 which is kept from rotating by a squared pin 158 extending into the end thereof, this pin being suitably secured to the floating base 155. The result is that when the sprocket 151 is turned the adjustment shaft 157 is advanced axially. This axial movement is transmitted to the control shaft 146 through a thrust bearing 159 carried in a cup 160 forming a part of the adjustment shaft 157.

The floating countershaft 140 also carries a pulley means 165 including a flange member 166 directly connected to the countershaft 140, and including a flange member 167 slidable with respect to this countershaft. The distance between these flange members is controlled by the control member 146 which carries a ring 168. This ring may be connected to the flange member 167 through pins 169 extending through elongated openings 170 of the countershaft 140. Thus, the flange members 141 and 167 are simultaneously adjusted.

The pulley means 165 is operatively connected by a belt means 176 to a pulley means 177 which may be identical with the pulley means 63, previously described. An adjustment means 178 is provided for moving the outermost flange member when a sprocket 179 corresponding to the sprocket 88 is turned. This sprocket 179 is connected by a chain to a sprocket 180 carried by the shaft 135. Thus, as the hand wheel 135 is turned, the pulley means 127, 138, 165, and 177 are simultaneously adjusted. It should not be understood, however, that we are limited to the exact mechanism shown for securing this simultaneous adjustment.

The floating countershaft 140 is journalled by bearings 185 and 186 carried in a hub 187. This hub is supported on the upper end of one leg of a U-shaped support 188, the other end of this support carrying the floating base 155.

This support carries a pin 192 which is journalled in bifurcations 193 of a horizontal extending support member 194. The opposite end of this support member in turn carries bifurcations 195 which retain a shaft 196 suitably journalled in lugs 197 extending upward from the base of the enclosing structure.

The result of this structure is that the countershaft 140 floats so as to be movable either horizontally or vertically. This movement can thus be used to maintain the proper tension in the belts, and in the absence of other elements the tension will be substantially equalized between the belt means 136 and 176. Usually, however, the weight of the countershaft and its attached pulley means, together with the support 188, is too great to thus provide the proper tension adjustment. It is thus possible to use a compression spring 199 extending between the horizontal support 194 and the base of the enclosing structure to support a portion of the weight of the countershaft 140 and its attached means. The size of this spring thus regulates the tension developed in the belt means. Of course, if the shaft and its attached structure are not sufficient to maintain the desired tension, it is possible to make the spring 199 a tension spring. So also, it is possible to utilize a spring 199 which is of sufficient strength to support the entire weight of the countershaft and its attached elements, thus using the excess compression of the spring to control the tension of the belt means.

With a speed reduction system shown as shown in Fig. 5, the torque transmitted by the belt means 176 is of course much greater than the torque transmitted by the belt means 136. For this reason it is often desirable to maintain the tensions in these belt means at different values, it being usually desirable to maintain the belt means 176 tighter than the belt means 136. To accomplish this result, we may utilize a tension spring 200 extending between the horizontal support 194 and the U-shaped support 188, as best shown in Fig. 6. This spring tends to move the floating countershaft 140 leftward as viewed in Fig. 6, thus increasing the tension of the belt means 176.

While we have shown our invention in conjunction with an electric motor, it is clear that the novelty of our system is not limited thereto. The transmission means herein disclosed are in themselves novel regardless of the driven and drive members.

Various modifications and changes may be made in the structure herein shown without departing from the spirit of the invention.

We claim as our invention:

1. In combination: a drive shaft; a variable-diameter pulley means of the adjustable V-type on said drive shaft and including flange members rotating with said drive shaft, one of said flange members being movable toward and away from the other to change the effective diameter of said pulley means; a primary adjustment means mechanically interconnecting said flange members for changing the distance therebetween when said primary adjustment means is operated; a driven shaft; means for mounting said driven shaft in floating relationship, said means including means for mounting said driven shaft to move radially vertically and means for mounting said driven shaft to move radially horizontally, said mounting means cooperating to permit said driven shaft to move radially in any directional component of said vertical and horizontal movements; a variable-diameter pulley means of the adjustable V-type on said driven shaft and including flange members one of which is movable toward and away from the other to change the effective diameter of this pulley means; a secondary adjustment means mechanically interconnecting said flange members of said pulley means on said driven shaft to change the effective diameter of this pulley means; a belt means extending around both of said pulley means; and a control means operatively connecting said primary and secondary adjustment means for simultaneously moving the same.

2. In combination: a drive shaft; a primary pulley means of the adjustable V-type on said drive shaft; a countershaft; means for rotatably mounting said countershaft in floating relationship; a secondary pulley means of the adjustable V-type on said countershaft; a belt means connecting said primary and secondary pulley means; a tertiary pulley means operatively connected to said secondary pulley means and being of the adjustable V-type, said tertiary pulley means being mounted on said countershaft; a driven shaft; a quaternary pulley means of the adjustable V-type connected to said driven shaft, each of said pulley means including a pair of flange members one of which is movable toward and away from the other; a belt means connecting said tertiary and quaternary pulley means; an adjustment means individually associated with each of said pulley means and mechanically interconnecting said flange members of its corresponding pulley means; and control means operatively connected to said adjustment means associated with said primary, secondary, tertiary, and quaternary pulley means for simultaneously operating all of these adjustment means.

3. In combination: a drive shaft; a primary pulley means of the adjustable V-type on said drive shaft; a driven shaft; a countershaft; bearing means for said countershaft; linkage means carrying said bearing means to journal said countershaft in floating relationship with said drive and driven shafts; a secondary pulley means of the adjustable V-type on said countershaft; a belt means connecting said primary and said secondary pulley means; a tertiary pulley means operatively connected to said secondary pulley means and being of the adjustable V-type, said tertiary pulley means being mounted on said countershaft; a quaternary pulley means of the adjustable V-type connected to said driven shaft, each of said pulley means including a pair of flange members one of which is movable toward and away from the other; a belt means connecting said tertiary and quaternary pulley means; an adjustment means individually associated with each of said pulley means and mechanically interconnecting said flange members of its corresponding pulley means; and control means operatively connected to said adjustment means associated with said primary, secondary, tertiary, and quaternary pulley means for simultaneously operating all of these adjustment means.

4. In combination: a drive shaft; a primary pulley means of the adjustable V-type on said drive shaft; a driven shaft; a countershaft; bearing means for said countershaft; a pair of supports pivoted to each other, one of said supports carrying said bearing means; means for pivoting the other of said supports whereby said countershaft is journalled in floating relationship with said drive and driven shafts; a secondary pulley means of the adjustable V-type on said countershaft; a belt means connecting said primary and said secondary pulley means; a tertiary pulley means operatively connected to said secondary pulley means and being of the adjustable V-type, said tertiary pulley means being mounted on said countershaft; a quaternary pulley means of the adjustable V-type connected to said driven shaft, each of said pulley means including a pair of flange members one of which is movable toward and away from the other; a belt means connecting said tertiary and quaternary pulley means; an adjustment means individually associated with each of said pulley means and mechanically interconnecting said flange members of its corresponding pulley means; and control means operatively connected to said adjustment means associated with said primary, secondary, tertiary, and quaternary pulley means for simultaneously operating all of these adjustment means.

5. In combination: a drive shaft; a primary pulley means of the adjustable V-type on said drive shaft; a driven shaft; a countershaft; a secondary pulley means of the adjustable V-type on said countershaft; bearing means for said countershaft; a pair of supports pivoted to each other, one of said supports carrying said bearing means; means for pivoting the other of said supports whereby said countershaft is journalled in floating relationship with said drive and driven shafts; a belt means connecting said primary and said secondary pulley means; a tertiary pulley means operatively connected to said secondary pulley means and being of the adjustable V-type, said tertiary pulley means being mounted on said countershaft; a quaternary pulley means of the adjustable V-type connected to said driven shaft, each of said pulley means including a pair of flange members one of which is movable toward and away from the other; a belt means connecting said tertiary and quaternary pulley means; an adjustment means individually associated with each of said pulley means and mechanically interconnecting said flange members of its corresponding pulley means; control means operatively connected to said adjustment means associated with said primary, secondary, tertiary, and quaternary pulley means for simultaneously operating all of these adjustment means; and means resiliently forcing said countershaft to move in a direction to maintain the tension in one of said belt means greater than in the other of said belt means.

6. In combination: a drive shaft; a countershaft; a primary pulley on said drive shaft and a secondary pulley on said countershaft, said pulleys being in operative alignment, one of said pulleys being of the variable-diameter V-type having a pair of flange members one of which is movable toward and away from the other; a driven shaft; a tertiary pulley on said countershaft and a quaternary pulley on said driven shaft, said tertiary and quaternary pulleys being in operative alignment, one of said pulleys being of the variable-diameter V-type having a pair of flange members one of which is movable toward and away from the other; adjustment means associated with each of said pulleys and mechanically interconnecting the flange members of each of said variable-diameter pulleys; means for floatingly supporting said countershaft; a first belt means operatively connecting said primary and secondary pulleys; a second belt means operatively connecting said tertiary and quaternary pulleys; and control means operatively associated with said adjustment means for operating said adjustment means to vary the diameter of said variable-diameter pulleys, said countershaft moving on said floating support relative to said drive and driven shafts to maintain the tension in said belt means as said control means is actuated.

7. In combination: a drive shaft adapted to be driven by a source of power; a power receiving shaft; means for supporting said power receiving shaft in floating relation with respect to said drive shaft, said means including means for mounting said power receiving shaft to move radially vertically and means for mounting said power receiving shaft to move radially horizontally, said mounting means cooperating to permit said power receiving shaft to move radially in any directional component of said vertical and horizontal movements; a primary pulley means on said drive shaft; a secondary pulley means on said power receiving shaft, each of said pulley means being of the variable-diameter V-type having a pair of flanges one of which is axially movable relative to the other; belt means operatively connecting said pulley means; an adjustment means individually associated with each of said pulley means and mechanically interconnecting said flange members of its corresponding pulley means; and control means operatively connected to said adjustment means associated with said primary and secondary pulley means for operating each of said adjustment means to vary the effective diameter of each of said pulley means, said power receiving shaft being permitted by said floating support to maintain the tension in said belt means as said control means is actuated.

8. A combination as defined in claim 7, in which said adjustment means may be simultaneously actuated by said control means to simultaneously vary the diameter of said pulley means.

9. In combination: a drive shaft adapted to be driven by a source of power; a power receiving shaft; floating supporting means for supporting said power receiving shaft in floating relationship with respect to said drive shaft, said means including means for mounting said power receiving shaft to move radially vertically and means for mounting said power receiving shaft to move radially horizontally, said mounting means cooperating to permit said power receiving shaft to move radially in any directional component of said vertical and horizontal movements; a primary pulley means on said drive shaft; a secondary pulley means on said power receiving shaft, each of said pulley means being of the variable-diameter V-type having a pair of flange members one of which is axially movable relative to the other; belt means operatively connecting said pulley means; an adjustment means associated with each of said pulley means and adapted to move each of said movable flange members axially; and control means operatively connected to both of said adjustment means and adapted to actuate said adjustment means to vary the effective diameter of each of said pulley means, said floating supporting means automatically maintaining the tension in said belt means as the effective diameters of said pulley means are varied.

10. In a variable speed transmission device, the combination of: a drive shaft adapted to be driven by a source of power; a power receiving shaft; means for supporting said power receiving shaft comprising a supporting arm secured relative thereto, a link pivoted to said arm, said link being pivoted to a base member; a primary pulley means on said drive shaft; a secondary pulley means on said power receiving shaft of the variable-diameter V-type having a pair of flange members one of which is axially movable relative to the other; and belt means operatively connecting said pulley means.

11. In a variable speed transmission device, the combination of: a drive shaft adapted to be driven by a source of power; a power receiving shaft; a power delivery shaft; means for supporting said power receiving shaft comprising a supporting arm secured relative thereto, a link pivoted to said arm, said link being pivoted to a base member; primary pulley means on said drive shaft; secondary pulley means on said power receiving shaft, comprising a pair of pulleys of the variable-diameter V-type; tertiary pulley means on said power delivery shaft; primary belt means connecting said primary pulley means with one of said pulleys of said secondary pulley means; and secondary belt means connecting the other of said pulleys of said secondary pulley means with said tertiary pulley means.

12. In a variable speed transmission device, the combination of: a drive shaft adapted to be driven by a source of power; a power receiving shaft; a power delivery shaft; means for supporting said power receiving shaft comprising a supporting arm secured relative thereto, a link pivoted to said arm, said link being pivoted to a base member; primary pulley means on said drive shaft; secondary pulley means on said power receiving shaft, comprising a pair of pulleys of the variable-diameter V-type; tertiary pulley means on said power delivery shaft; primary belt means connecting said primary pulley means with one of said pulleys of said secondary pulley means; secondary belt means connecting the other of said pulleys of said secondary pulley means with said tertiary pulley means; and spring means for urging said secondary pulley means in a direction away from said tertiary pulley means.

13. In a variable speed transmission device, the combination of: a drive shaft adapted to be driven by a source of power; a power receiving shaft; a power delivery shaft; means for supporting said power receiving shaft comprising a supporting arm secured relative thereto, a link pivoted to said arm, said link being pivoted to a base member, and a spring connecting said arm and said link; primary pulley means on said drive shaft; secondary pulley means on said power receiving shaft, comprising a pair of pulleys of the variable-diameter V-type; tertiary pulley means on said power delivery shaft; primary belt means connecting said primary pulley means with one of said pulleys of said secondary pulley means; and secondary belt means connecting the other of said pulleys of said secondary pulley means with said tertiary means.

14. In a variable speed transmission device, the combination of: a drive shaft adapted to be driven by a source of power; a power receiving shaft; a power delivery shaft; means for supporting said power receiving shaft comprising a supporting arm secured relative thereto, a link pivoted to said arm, said link being pivoted to a base member, a primary spring connecting said arm and said link, and a secondary spring acting between said link and said base member; primary pulley means on said drive shaft; secondary pulley means on said power receiving shaft, comprising a pair of pulleys of the variable-diameter V-type; tertiary pulley means on said power delivery shaft; primary belt means connecting said primary pulley means with one of said pulleys of said secondary pulley means; and secondary belt means connecting the other of said pulleys of said secondary pulley means with said tertiary pulley means.

15. In a variable speed transmission device, the combination of: a drive shaft adapted to be driven by a source of power; a power receiving shaft; means for supporting said power receiving shaft in floating relationship so that it may move vertically, horizontally, or in any combination of vertical and horizontal movements; a primary pulley means on said drive shaft; a secondary pulley means on said power receiving shaft of the variable-diameter V-type having a pair of flange members one of which is axially movable relative to the other; and belt means operatively connecting said pulley means.

CARL E. JOHNSON.
EARL MENDENHALL.